April 7, 1970  W. E. WINSCHE  3,504,494
INTERMITTENT POWER SOURCE
Filed Oct. 28, 1968
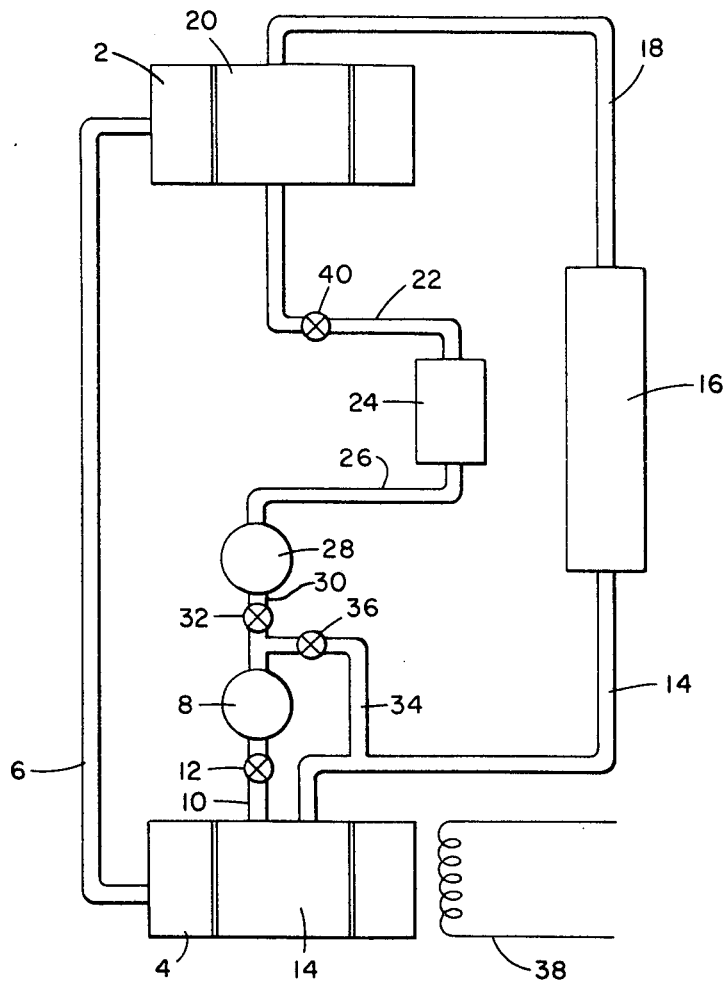
INVENTOR.
WARREN E. WINSCHE
BY

United States Patent Office 3,504,494
Patented Apr. 7, 1970

3,504,494
INTERMITTENT POWER SOURCE
Warren E. Winsche, Bellport, N.Y., assignor to the United States of America as represented by the United States Atomic Energy Commission
Filed Oct. 28, 1968, Ser. No. 771,218
Int. Cl. F01k *17/00, 27/00;* F23n *1/00*
U.S. Cl. 60—64                           3 Claims

ABSTRACT OF THE DISCLOSURE

A method of producing closed cycle high energy steam power from a low energy isotope source wherein the heat for steam production is gained by desorbing hydrogen from a first metal hydride bed onto a second metal hydride bed with a hydrogen recycling from the second to the first bed being powered by a low energy isotope source.

Background of the invention

There are many situations in space, deep sea operations and remote operations where power or heat are required in large amounts but only for short periods of time. If a radioisotope powered generator is sized to meet these needs, it is very wasteful of the capability of the system since it must be sized to meet the peak demand and must waste all the power, or heat in other parts of the duty cycle.

The art has long sought a method of storing the energy given off by low energy isotope sources in order to allow its release as large energy bursts capable of performing intermittently large quantums of work at preset intervals or upon command of the operator.

Summary of the invention

The invention described herein was made in the course of, or under a contract with the United States Atomic Energy Commission.

A method of producing steam power, intermittently comprising simultaneously:

(a) desorbing hydrogen from a first metal hydride bed while adsorbing the desorbed hydrogen onto a second metal hydride bed, each of the metal hydride beds developing the same equilibrium pressure of hydrogen when the temperature of the first bed is at $T_1$ and the temperature of the second bed is at $T_2$ and $T_1 > T_2 > T_3$, where $T_3$ is the ambient temperature;

(b) heating water to convert the water to steam with the heat created by the adsorption of hydrogen onto said second bed;

(c) extracting power from said steam;

(d) utilizing the heat in the spent steam to heat the first bed in order to increase the rate of desorption of hydrogen from the first bed; thereafter simultaneously.

(e) cooling the first bed by rejecting heat to the surroundings;

(f) heating the second bed to cause hydrogen to be desorbed from the second bed and to be absorbed by the first bed; and (g) condensing the steam produced during the steam generation cycle into a water reservoir for use in the next steam power generation cycle.

Brief description of the drawing

The figure shows a schematic arrangement of a steam generator capable of carrying out a method of power production in accordance with my invention.

Brief description of the embodiment

In my novel method of producing steam power intermittently, I have essentially 2 cycles, a power cycle and recharging cycle. In the power cycle, hydrogen is desorbed from a first metallic hydride bed and adsorbed onto a second hydride bed with the heat of adsorbtion being utilized to convert water into steam, extracting power from the steam, and using the spent steam to heat the first metallic bed to increase the rate of desorbtion of hydrogen from the first bed and the rate of absorption onto the second bed with subsequent recondensation of the steam for use in another power cycle. When the power cycle is completed, the steam producing portion is closed down and the second metallic hydride bed is heated by an conventional heat producing source, i.e., low powered radioistope heat source, chemical heaters, electrical heaters, etc. to cause the hydrogen adsorbed therein during the power cycle to desorb from the second metallic hydride bed thus recharging the system.

A schematic arrangement embodying this conception is shown in the figure. Although operation of the system is given hereinafter in terms of a specific system with specific subunits incorporated therein, it will be obvious that other combinations of different metallic hydride bed, engines, and devices for utilizing the power and principles disclosed herein can be used with the general principles involved.

Referring to the figure, the principles of this invention can be described as follows: the first bed 2 is a $Ti_2Fe$ metallic hydride bed operatively connected by a pipe 6 to the second bed 4 which is MgCu bed so that hydrogen can reversibly flow between the beds and can be contained therein. At the inception of a power cycle the first bed 2 is charged with hydrogen and the second bed 4 does not have any substantial amount of hydrogen contained therein. The second bed 4 is heated by a heat source 38 to a high temperature.

A boiler feed tank 8 is filled with water connected by a pipe 10 having a valve 12 to a boiler 14 which boiler is operatively connected to the second bed 4 so that water may be supplied to the boiler on command and converted to steam by the heat given off by the absorption of hydrogen onto bed. A steam line 14 carries the steam thus produced to a power utility unit 16 such as a dynamo, mechanical device, radiator, etc. where some of the energy is extracted from the steam.

The spent steam is then conveyed by a steam line 18 to a heat exchanger 20 which exchanger is imbedded in the first bed 2 for the purpose of heating the first bed 2 to increase the rate of desorbtion of hydrogen therefrom in order to increase the power level output of the system. Thereafter the spent steam is conducted through steam line 22 to a condensor 24 where the spent steam is condensed and the liquid is carried by pipe 26 to a condensate accumulator 28 where it is held for use in another power cycle. The accumulator 28 is connected to the boiler feed tank by a pipe 30 having valve 32. A pipe 34 having a valve 36 connects pipe 30 between the valve 32 and the boiler fed tank 8 to steam pipe 14 to allow for pressure equalization in the steam system. The steam system shown is a gravity fed system to illustrate the principles of the invention and it will be obvious to those skilled in the art that different power utilization systems can be employed to advantage to meet operating requirement.

At the start of a power cycle the boiler feed vessel 8 is filled with water, valve 32 is closed and valves 36 and 12 are opened. Water flows into the boiler 14 which is evaporated and generates steam at high pressure, and which causes the temperature in the second bed 4 to drop and it attains a value at which hydrogen begins to transfer from the first bed 2 to the second bed 4 and in doing so provides the heat of vaporization of additional water at a suitably high temperature determined by the characteristics of the MgCu contained in bed 4. The high pressure steam expands through the system doing work in the power utility unit 16 and the spent steam is lead to the heat exchanger 20. The steam pressure in the heat exchanger 20 is controlled by a back pressure valve 40 in the steam line 22, so that a preset predetermined amount of heat exchange is accomplished in the first bed 2 to maintain the temperature of the first bed 2. Since the first bed is now dehydriding, 8000 calories must be supplied by condensing steam for every gram of hydrogen supplied to the second bed 4.

If the engine is less than 50% efficient, there will be more waste heat available that the first bed 2 requires. This excess heat is removed by condensing lower pressure steam in the external condenser 24 and rejecting this heat to the environment. The external condenser should be over-designed in order to insure that the back pressure does not rise above the value needed in the heat exchanger 20. The condensate is collected in the accumulator 28.

In a properly designed system all of the water in the boiler feed tank will have been fed when the second bed 4 nears completion of the hydriding cycle.

During the recharging cycle the second bed 4 is heated by a heat source 38 causing it to dehydride while the first bed 2 is allowed to discharge its heat to the environment, thus enabling it to adsorb the hydrogen given off by the second bed 4. During this cycle water is transferred from the accumulator to the boiler feed tank after which valve 32 is closed. Thus the system is ready for another power cycle.

The heat source 38 can be either a continuous or an intermittent one. If an intermittent heat source is utilized to effectuate dehydriding of the second bed 4, and the heating of this bed to initiate steam production, means will have to be provided to prevent the interflow of hydrogen between the beds at times when it is not desired. Any conventional heat source may be employed, however in the preferred embodiment of my invention I use a constant heat producing source such as a low powered radioisotope heat generator as it is ideally suited for use in my invention due to their reliability and the obvious economic advantage gained therefrom.

Conventional metallic hydride beds capable of reversibly absorbing and desorbing hydrogen in response to thermal effects in a closed system can be utilized in the practice of my invention, provided that each of said bed means develops the same equilibrium pressure of hydrogen when the temperature of the first bed is at $T_1$ and the temperature of the second bed 4 is at $T_2$ and $T_1 > T_2 > T_3$, where $T_3$ is the ambient temperature. For example, the first bed can be composed of titanium iron alloys as disclosed in U.S. patent application Ser. No. 710,663, H. R. Wiswall, Jr., and J. J. Reilly, Jr., entitled "An Improved Method of Storing Hydrogen," filed on Mar. 5, 1968, and the second bed 4 can be composed of copper-magnesium alloys as disclosed in U.S. Patent No. 3,375,676, J. J. Reilly, Jr., and R. H. Wiswall, Jr., issued Apr. 2, 1968. Of course the size and shape of the specific beds employed will be dependent on the size and type of the power generation system employed, and such choices will be obvious to those skilled in the art.

It will be obvious to those skilled in the art that my novel method of power generation is ideally suited to provide an economical, efficient, long lasting power source for use in remote locations.

I claim:
1. A method of producing steam power intermittently comprising simultaneously:
   (a) desorbing hydrogen from a first metal hydride bed while adsorbing the desorbed hydrogen onto a second metal hydride bed, each of the metal hydrides developing the same equilibrium pressure of hydrogen when the temperature of the first bed is at $T_1$ and the temperature of the second bed is at $T_2$ and $T_1 > T_2 > T_3$, where $T_3$ is the ambient temperature;
   (b) heating water to convert the water to steam with the heat created by the adsorption of hydrogen onto said second bed;
   (c) extracting power from said steam;
   (d) utilizing the heat in the spent steam to heat the first bed in order to increase the rate of desorption of hydrogen from the first bed; thereafter simultaneously,
   (e) cooling the first bed by rejecting heat to the surroundings;
   (f) heating the second bed to cause hydrogen to be desorbed from the second bed and to be absorbed by the first bed; and
   (g) condensing the steam produced during the steam generation cycle into a water reservoir for use in the next steam power generation cycle.

2. A method in accordance with claim 1 wherein said first metal hydride bed is composed of a titanium-iron alloy.

3. A method in accordance with claim 2 wherein the second metal hydride bed is composed of a copper-magnesium alloy.

References Cited

UNITED STATES PATENTS

| | | | |
|---|---|---|---|
| 2,706,890 | 4/1955 | Schmidt | 60—50 |
| 2,968,156 | 1/1961 | Pacault et al. | 60—73 |
| 3,375,676 | 4/1968 | Reilly et al. | 62—48 |

MARTIN P. SCHWADRON, Primary Examiner

R. R. BUNEVICH, Assistant Examiner

U.S. Cl. X.R.

60—50, 106; 122—4